Figure 1:
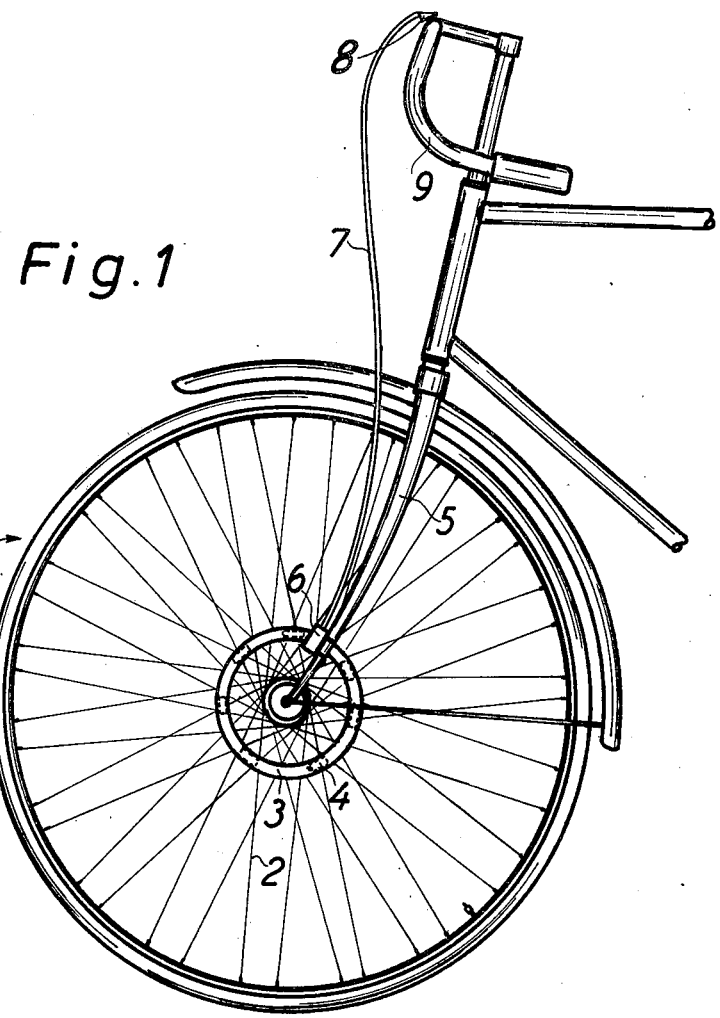

United States Patent [19]

Dunch

[11] 4,331,918
[45] May 25, 1982

[54] SPEEDOMETER FOR CYCLES AND MOPEDS

[75] Inventor: Poul Dunch, Korsoer, Denmark

[73] Assignee: Basta Laasefabrik A/S, Korsoer, Denmark

[21] Appl. No.: 152,049

[22] Filed: May 21, 1980

[51] Int. Cl.³ .............................................. G01P 3/48
[52] U.S. Cl. ................................ 324/174; 200/61.12; 340/671
[58] Field of Search .................. 324/174, 168, 166; 200/61.12, 61.57; 307/120; 340/671; 73/518; 361/236, 240, 241; 180/171, 170

[56] References Cited

U.S. PATENT DOCUMENTS

| | | | |
|---|---|---|---|
| 2,692,951 | 10/1954 | Voelker | 340/671 X |
| 3,417,289 | 12/1968 | Jensen | 361/236 |
| 3,505,595 | 4/1970 | Favre | 340/671 X |
| 3,559,205 | 1/1971 | Colby | 340/671 X |
| 3,739,367 | 6/1973 | Fathauer | 340/671 X |
| 3,898,563 | 8/1975 | Erisman | 324/166 |
| 4,019,171 | 4/1977 | Martelet | 200/61.12 X |
| 4,025,819 | 5/1977 | Lafever | 361/236 |
| 4,156,190 | 5/1979 | Chittenden et al. | 324/168 X |

FOREIGN PATENT DOCUMENTS

| | | | |
|---|---|---|---|
| 557948 | 12/1943 | United Kingdom | 73/518 |
| 1161984 | 8/1969 | United Kingdom | 324/168 |
| 1315442 | 5/1973 | United Kingdom | 324/168 |

OTHER PUBLICATIONS

Lagergren et al., Integral Emitter and Handwheel, IBM Technical Disclosure Bulletin, Apr. 1971, p. 3339.
Mereness, Bicycle Tachometer/Speedometer, IBM Technical Disclosure Bulletin, Feb. 1975, pp. 2570 & 2571.

Primary Examiner—Stanley T. Krawczewicz
Attorney, Agent, or Firm—Kenyon & Kenyon

[57] ABSTRACT

Speedometer for cycles and mopeds, of the type by which the measurement is effected by means of a reed relay secured to a stationary part of the vehicle and a number of permanent magnets fastened to one of its wheels, said magnets being arranged to move past the reed relay during the rotation of the wheel. The permanent magnets (4) are molded into a holder (3), said holder being secured to the spokes (2) of the wheel by means of an associated part (14), said associated part (14) being inside the wheel and fastened to the holder (3) in such a way that the two parts (3) and (14) can be secured to the spokes (2) of the wheel. The permanent magnets (4) are positioned in the holder (3) at the same radii from the hub of the wheel, and at the same mutual distance between individual magnets (4). The holder (3) and the associated part (14) can be produced of synthetic material, and said associated part (14) can consist of two half parts.

5 Claims, 5 Drawing Figures

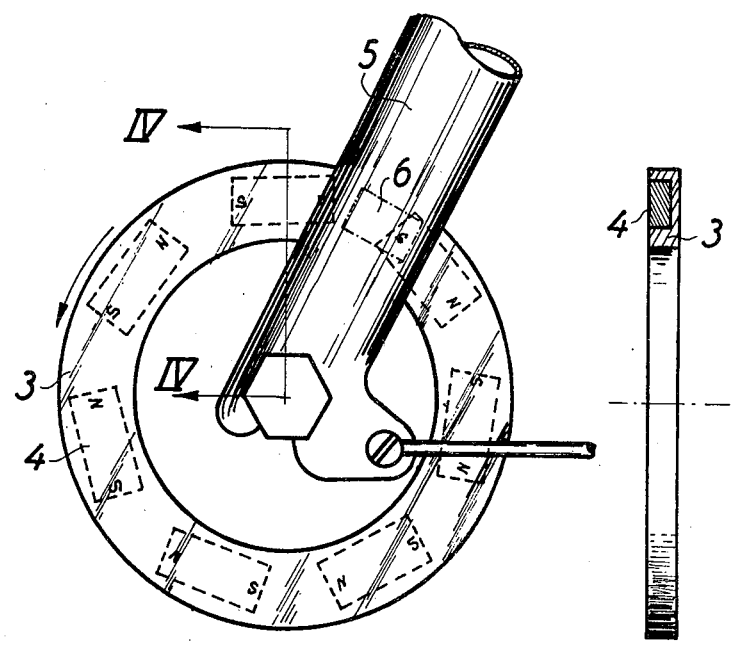
Fig. 3
Fig. 4
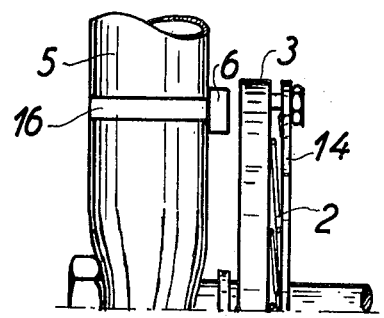
Fig. 5

SPEEDOMETER FOR CYCLES AND MOPEDS

This invention relates to a speedometer, especially for cycles and mopeds, and of the type wherein the measurement is effected by means of a reed relay secured to a stationary part of said cycle or moped, and a number of permanent magnets secured to one of its wheels, the magnets thus moving past the reed relay during the rotation of the wheel.

U.S. Pat. No. 3,898,563 describes a speedometer of the above type, wherein the permanent magnets are secured to the spokes of the wheel. This magnet arrangement has certain disadvantages, one of these being that the mounting of the magnets can be difficult, another being that it is difficult to position the magnets at precise mutual intervals. Furthermore, the number of magnets is determined to a certain degree by the spokes.

The object of this invention is to provide a speedometer which is not encumbered with the above-mentioned disadvantages.

This object is achieved by moulding the permanent magnets into an annular holder at uniform intervals, and by providing said holder with a securing means by which it can be fastened to the spokes at the outer side of the wheel. This arrangement makes it possible to position a suitable and partly arbitrary number of magnets at precise mutual intervals and, furthermore, makes the mounting or replacement of a set of magnets a very simple matter.

In accordance with claim 2, the invention can be characterized by the holder being secured by means of a two-part ring, said ring being arranged to secure the annular holder against the spokes of the wheel. This method of mounting is most advantageous.

Finally, the invention can be characterized by said annular holder and said two-part ring being manufactured of synthetic material. This material is particularly suitable for the purpose.

Figure 2:
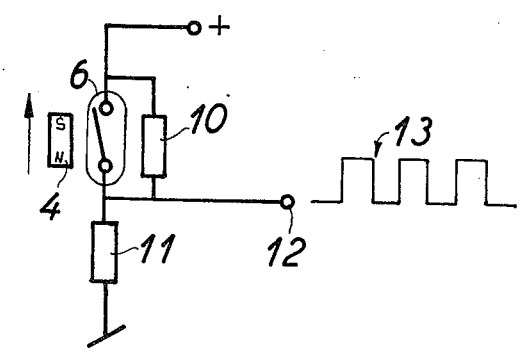

The invention will now be described in more detail with reference to the accompanying drawings, where FIG. 1 shows a speedometer according to this invention mounted on a bicycle, FIG. 2 shows a schematic arrangement of the speedometer pick-up, FIG. 3 shows the positioning of the permanent magnets, FIG. 4 shows a section along the line IV—IV in FIG. 3, and FIG. 5 shows the securing arrangement of the magnet holder.

FIG. 1 shows the speedometer according to this invention fitted to a bicycle. On the spokes 2 of the front wheel 1 is secured an annular disc 3, into which are moulded seven permanent magnets 4. On the front fork 5 is fastened a pick-up 6, said pick-up comprising a reed relay connected by a lead 7 to an instrument 8 on the handlebars 9.

With reference to FIG. 2, which is a schematic arrangement of the speedometer pick-up, a reed relay 6 is positioned close enough to the moving magnets 4 to enable the magnetic field of said magnets to close the reed relay momentarily during their rotation past said relay. The reed relay is connected to a source of current, for example an ordinary 4.5 volt dry battery, and two resistors 10 and 11, the signals generated at the output 12 thus having the pulse shape 13. The output 12 is connected to a conventional measuring circuit contained within the instrument housing 8.

The precise positioning of the magnets 4 in the annular disc 3 is shown in FIGS. 3 and 4.

With reference to FIG. 5, the annular disc 3 is fastened firmly against the spokes 2 of the wheel by means of an associated part 14, said associated part 14 consisting of two half parts which clamp the annular disc 3 to the spokes 2 by means of screws 15. The pick-up 6 is fastened to the front fork 5 by means of an ordinary securing clip 16, but can also be mounted on a baseplate secured to the wheel's hub bolt.

The invention is not limited to the embodiment having the seven permanent magnets shown in the example. This number of magnets is suitable for a 26" wheel. A greater or smaller number of magnets may be used with wheels of larger or smaller diameters respectively. The number of permanent magnets used in the preferred embodiment has been chosen to produce a registration of 1 kph corresponding to approx. 1 pulse per second. It will be obvious that the measuring pulses for the speedometer can also be used to generate pulses for a kilometer counter placed in the instrument housing 8.

I claim:

1. A sensor assembly for a speedometer, the assembly including a reed switch, means for mounting the reed switch on a stationary part of a spoked wheel vehicle adjacent to the spokes of a wheel thereof, a plurality of permanent magnets, and means for attaching the permanent magnets to spokes of the wheel so as to move past the reed switch when the wheel rotates, the improvement wherein:

said means for attaching the permanent magnets to spokes of a wheel comprises a non-magnetic annular holder having the permanent magnets embedded therein at equally spaced angular intervals and means for securing the annular holder concentrically with the axis of wheel rotation against the spokes of a wheel on the side adjacent to the mounting location of the reed switch.

2. A sensor assembly according to claim 1 wherein the means for securing the annular holder comprises a ring having the same mean diameter as the annular holder, the ring being divided into two arcuate segments for placement on the other side of the spokes from the annular holder, and threaded fasteners for joining the two-part ring to the annular holder.

3. A sensor assembly according to claim 2 wherein the annular holder and the two-part ring are molded from a synthetic material.

4. A sensor assembly according to claim 1 or 6 wherein the annular holder has a planar face perpendicular to the axis of the holder, and the magnets are embedded into the annular holder flush with said planar face.

5. A sensor assembly according to claim 4 wherein each magnet is an elongated bar magnet having a north pole at one end and a south pole at the other end, and the magnets are disposed in the annular holder with their longitudinal axes tangent to a circle concentric with the axis of the holder and parallel to said planar face, so said north and south poles pass the reed switch in alternating sequence when the wheel rotates.

* * * * *